United States Patent [19]

Motz et al.

[11] 4,180,597

[45] Dec. 25, 1979

[54] MANUFACTURE OF MAGNETIC RECORDING MEDIA

[75] Inventors: Herbert Motz, Beindersheim; Norbert Schneider, Mutterstadt; Hans-Joerg Hartmann, Freinsheim; Reinhold Baur, Offenburg, all of Fed. Rep. of Germany

[73] Assignee: BASF Aktiengesellschaft, Fed. Rep. of Germany

[21] Appl. No.: 940,462

[22] Filed: Sep. 8, 1978

[30] Foreign Application Priority Data

Sep. 14, 1977 [DE] Fed. Rep. of Germany ....... 2741341

[51] Int. Cl.² .............................................. H01F 10/02
[52] U.S. Cl. ...................................... 427/48; 427/128; 428/900
[58] Field of Search ............................... 427/127–132, 427/48; 428/900; 252/62.54

[56] References Cited

U.S. PATENT DOCUMENTS 3,625,760  12/1971  Slovinsky ............................. 117/235

Primary Examiner—Bernard D. Pianalto
Attorney, Agent, or Firm—Keil & Witherspoon

[57] ABSTRACT

A process for the manufacture of a magnetic recording medium by producing a dispersion of a finely divided anisotropic magnetic material and conventional additives in a solution of a polymeric binder in an organic solvent, applying a layer of the dispersion to a nonmagnetizable base material, then orienting the anisotropic magnetic material by means of a magnetic field, and drying the layer, wherein a compound of the formula (I)

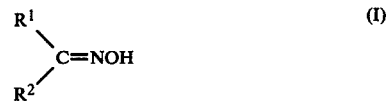

where $R^1$ is straight-chain or branched akyl of 2 to 10 carbon atoms, cycloalkyl of 6 to 10 carbon atoms or aralkyl of 7 to 14 carbon atoms and $R^2$ is hydrogen or one of the radicals given in the definition of $R^1$, is added to the dispersion.

10 Claims, No Drawings

MANUFACTURE OF MAGNETIC RECORDING MEDIA

The present invention relates to a process for the manufacture of magnetic recording media, which can in particular be used as audio tapes, video tapes or computer tapes, by producing a dispersion of a finely divided anisotropic magnetic material and conventional additives in a solution of a polymeric binder in an organic solvent, applying a layer of the dispersion to a non-magnetizable base material, then orienting the anisotropic magnetic material in a magnetic field, and drying the layer.

Magnetic layers in recording media used in modern audio and video recording and playback equipment have to conform to various requirements. In addition to excellent mechanical properties such as flexibility, elasticity, tensile strength and abrasion resistance, a constant improvement is particularly demanded in respect of recording characteristics and playback characteristics, particularly where cassette audio tapes, open-reel audio tapes and video tapes are concerned. To achieve this object, it is not only necessary to use particularly suitable magnetic pigments, eg. chromium dioxide, cobaltmodified iron oxides and ferromagnetic metal particles but also to select all the materials present in the magnetic layer so that the latter exhibits particularly high residual induction in the recording direction, and a markedly smooth surface. It is true that such magnetic layers must have a high content of magnetizable material, but it must also be possible to orient the magnetizable acicular particles in the layer to a very high degree in the envisaged recording direction. For a given magnetic material, it is particularly the improvement in the properties mentioned above, eg. surface roughness, residual induction and degree of orientation, which depends to a high degree on the binders and additives used in producing the magnetic layer. Amongst the additives, it is especially the dispersants which, through improving the dispersibility, affect both the compression and the orientation of the magnetic particles.

The reduction in surface roughness of the magnetic layer is particularly important with high quality magnetic recording media intended to record a wide band width including high frequencies since a particularly close tape/head contact is needed for resolution of very short wavelengths. Any unevenness leads to a gap between the tape surface and the head and hence leads to signal losses at high frequencies. In the prior art, magnetic recording media are calendered, after coating, by passing them between heated rollers under pressure. However, the achievable degree of calendering depends largely on the original smoothness of the dried layer; layers which originally are very rough cannot become as smooth on calendering as layers which before calendering were only slightly rough.

To achieve reasonable original smoothness, it has been repeatedly proposed that a dispersant be added to the liquid magnetic coating mixture, at the start of the dispersing process, to facilitate the dispersion of the magnetic pigment in the binder. In the main, surfactants with both a hydrophilic and a hydrophobic radical in the molecular structure, the active part of the structure being of anionic, cationic, amphoteric or non-ionic character, are employed for this purpose. The amount of these dispersants must be very carefully chosen in relation to the total formulation, since under adverse external conditions excess dispersant can very easily exude on the surface of the magnetic recording medium, for example to produce deposits and soiling on those parts of the equipment over which the tape passes, which is extremely undesirable. With most dispersants it is furthermore found that when they reach a certain concentration, which corresponds to saturation coverage of the active centers of the magnetic pigment surface, no further improvement in the dispersibility and hence in the achievable compression and orientation of the magnetic materials is found.

As will be appreciated from the Examples which follow, the present invention enables the production of magnetic recording media which are distinguished by a particularly smooth surface of the magnetic layer and especially by an increased packing density of the particles in the layer, coupled with an increase in orientation and hence in the residual magnetization in the intended recording direction. Because of these improvements, the recording media are, as will be appreciated from the Examples, distinguished by more advantageous recording and playback quality, especially at high frequencies.

According to the invention, there is provided a process for the manufacture of a magnetic recording medium which process comprises forming a dispersion of finely divided particulate anisotropic magnetic material in a solution of a polymeric binder in an organic solvent, the dispersion containing from 0.05% to 5% by weight, based on the amount of the magnetic material, of a compound of the formula (I) below:

wherein $R^1$ is straight-chain or branched alkyl of 2 to 10 carbon atoms, cycloalkyl of 6 to 10 carbon atoms or aralkyl of 7 to 14 carbon atoms and $R^2$ is hydrogen, straight-chain or branched alkyl of 2 to 10 carbon atoms, cycloalkyl of 6 to 10 carbon atoms or aralkyl of 7 to 14 carbon atoms; applying a layer of the dispersion to a non-magnetizable base; and thereafter effecting measures to dry the layer of dispersion and to magnetically orient the particles of anisotropic magnetic material of said dispersion, said measures being effected in any order provided that the magnetic layer has not solidified (as hereinbefore defined) prior to orientation of the particles.

The term "solidified" used above means that the magnetic dispersion has not become solid or has lost fluidity only to an extent insufficient to prevent magnetic orientation of the particles of magnetic material.

The oximes of the general formula (I) can be employed together with one or more conventional dispersants.

In developing the process of the invention, we have found that it is particularly advantageous only to add the oximes of the formula (I) after completion of dispersion of the mixture.

The oximes are added to the liquid dispersion in an amount of from 0.05 to 5% by weight, preferably from 0.2 to 2% by weight, e.g. from 0.5 to 1% by weight, based on the amount of magnetic material.

The compounds of the formula (I) may be obtained by conventional methods known to those skilled in the art. A preferred method is to react an aldehyde or ketone with hydroxylamine, as described, for example, in Houben-Weyl, Methoden der organischen Chemie, Thieme-Verlag Stuttgart 1968, Volume X/4, pages 55–76. Suitable starting materials are straight-chain, branched or cyclic aliphatic aldehydes of 2 to 10 carbon atoms, and aromatic aldehydes of 7 to 14 carbon atoms. Amongst ketone starting materials suitable compounds for the reaction with hydroxylamine are straight-chain, branched or cyclic aliphatic ketones of 3 to 10 carbon atoms, and aromatic or mixed aromatic-aliphatic ketones of 8 to 20 carbon atoms.

Aliphatic and cycloaliphatic ketoximes, particularly those of 3 to 8 carbon atoms, are preferred for use in the process of the invention. Examples include butanoneoxime, di-methylketoxime, methyl isobutyl ketoxime and methyl (iso)-amyl ketoxime.

The composition and preparation of the dispersion of the magnetic materials in the dissolved polymeric binder are conventional.

The magnetic material used is preferably finely divided optionally modified acicular gamma-iron(III) oxide, preferably having an average particle size of from 0.1 to 2 $\mu$m and especially from 0.1 to 0.9 $\mu$m or acicular chromium dioxide having the same particle structure as the above iron oxide. Further suitable materials are cubic gamma-iron(III) oxide modified with heavy metals, especially cobalt, and finely divided metal alloys of iron, cobalt and/or nickel.

The binder used for the dispersion of the finely divided magnetic materials may be one of those conventionally employed for the production of magnetic layers, for example an alcoholsoluble nylon copolymer, a polyvinylformal, a polyurethane elastomer, a mixture of one or more polyisocyanates and one or more polyhydroxy compounds or a vinyl chloride polymer containing more than 60% of vinyl chloride units (eg. a copolymer of vinyl chloride with one or more comonomers such as a vinyl ester of a monocarboxylic acid of 2 to 9 carbon atoms or an ester of an aliphatic alcohol of 1 to 9 carbon atoms and an ethylenically usaturated carboxylic acid of 3 to 5 carbon atoms—eg. an ester of acrylic acid, methacrylic acid or maleic acid; a copolymer of vinyl chloride with one or more of these carboxylic acids as such; or a hydroxyl-containing vinyl chloride copolymer which may conveniently be obtained by partial hydrolysis of a vinyl chloride/vinyl ester copolymer or by direct copolymerization of vinyl chloride with one or more hydroxyl-containing monomers, eg. allyl alcohol or 4-hydroxybutyl or 2-hydroxyethyl acrylate or methacrylate). Further suitable binders are mixtures of one or more polyurethane elastomers with one or more polyvinylformals, one or more phenoxy resins and/or one or more vinyl chloride copolymers of the composition mentioned above. Preferred binders are polyvinylformals and polyurethane elastomer-containing mixtures as just mentioned, especially mixtures with polyvinyl-formal(s).

Preferred polyurethane elastomer binders are commercial elastomeric polyester-urethanes obtained from adipic acid, 1,4-butanediol and 4,4'-diisocyanatodiphenylmethane.

In magnetic dispersions which are particularly suitable for the production of rigid magnetic recording disks, the binder is preferably an epoxy resin, phenoxy resin, aminoplast precondensate, polyester resin, polyurethane or polyurethane-forming system, or a mixture of one such binder with another such binder or with one or more other binders, such as a polycarbonate, a vinyl polymer, eg. a vinyl chloride copolymer, a vinylidene chloride copolymer, or a heat-curable acrylate or methacrylate copolymer.

The organic solvent may be an organic solvent conventionally used for making magnetic dispersions, especially an aromatic hydrocarbon, eg. benzene, toluene and xylene, an alcohol, eg. propanol and butanol, a ketone, eg. acetone and methyl ethyl ketone, an ether, eg. tetrahydrofuran and dioxane; a mixture of one or more such solvents with one or more other solvents, eg. one or more other solvents conventionally used for surface-coating binders, may be employed.

One or more auxiliaries for the production of the magnetic layers may be added to the dispersions; examples of additives are dispersing assistants, eg. lecithins, small proportions of one or more monocarboxylic acids (in the case of chromium dioxide, such preferably being present in the form of zinc oleate, zinc stearate or zinc isostearate), fillers, eg. carbon black, graphite, quartz powder and/or a non-magnetizable silicate-based powder, and flow improvers, eg. small amounts of silicone oil. Advantageously, the amount of these additives should not exceed a total of 12 percent by weight, preferably of 8 percent by weight, based on the dry weight of the magnetic layer.

The magnetic layers can be produced in a conventional manner. The magnetic material is, for example, dispersed in the binder and a desired amount of solvent in a conventional dispersing apparatus, eg. a tubular ball mill or a stirred ball mill, with addition of a dispersant of formula (I) and of any further additive(s). To obtain an advantageous binder solution-pigment ratio, the binder may be added to the mixture either as solids or in the form of solutions of from 20 to 60 percent strength. It has proved advantageous to continue dispersing step until the magnetic material has become extremely finely dispersed; this may require from 1 to 4 days. Subsequent repeated filtration gives a completely homogeneous magnetic dispersion. The compound of the formula (I) in cases where it is added after the prolonged dispersion just mentioned, is advantageously introduced into the dispersion, prepared above, by simple stirring-in or by more vigorous dispersion in a dispersion apparatus.

The magnetic dispersion can be applied to the non-magnetizable base by means of conventional coating equipment, eg. by means of a knife coater. The non-magnetizable bases used may be conventional base materials, especially films of linear polyesters, eg. polyethylene terephthalate, the thickness of the film being, in general, from 4 to 200 $\mu$m and especially from 6 to 36 $\mu$m. Before the magnetic dispersion is dried on the carrier, drying advantageously being carried out at from 50° to 90° C. for from 2 to 5 minutes, the anisotropic magnetic particles are oriented, by the action of a magnetic field, along the envisaged recording direction. The magnetic layers can then be calendered and compressed on conventional machinery by passing the recording medium between heated and polished rollers, with or without the use of pressure and of elevated temperatures (eg. from 50° to 100° C., preferably from 60° to 80° C.). The thickness of the magnetic layer is in general from 3 to 20 $\mu$m, preferably from 6 to 15 $\mu$m.

The magnetic recording media produced according to the invention are distinguished by improved residual induction and improved degree of orientation of the magnetic particles, as well as by low surface roughness. This increases the output level and the maximum output level at both low and high frequencies.

EXAMPLES 1 TO 8 AND COMPARATIVE EXPERIMENTS A TO C

The Examples and Comparative Experiments listed were carried out using the conventional methods. Parts and percentages are by weight.

The dispersion is produced by dispersing a mixture of magnetic material in a solution of binder and additives in a cooled stirred ball mill; the dispersion is then filtered and applied to a 7.5 μm thick polyethylene terephthalate film by means of a knife coater. The acicular magnetic particles are oriented with their easy axis in the lengthwise direction of the web of film by passing the film, carrying the liquid coating, over a magnet. The magnetic layers are then dried at from 60° to 90° C., giving a thickness of about 4.5 μm, and are calendered at 70° C. The coated calendered films are then cut into tapes 3.81 mm wide.

Tables 1 and 2 which follow show the composition of the individual magnetic dispersions. The magnetic materials used are an acicular chromium dioxide having a coercive force of 40 kA/m and a specific surface area of 20.4 m²/g and an acicular iron oxide, coated with a layer of cobalt ferrite, and having a coercive force of 44.5 kA/m and a specific surface area of 17.2 m²/g.

The binder used is a vinyl chloride copolymer comprising 80% of vinyl chloride, 10% of diethyl maleate and 10% of dimethyl maleate, a polyurethane elastomer obtained by reacting a polyester of adipic acid and 1,4-butanediol with diphenylmethane diisocyanate and butanediol, a polyvinylformal, obtained by reacting a polyvinyl ether with formaldehyde, and a phenoxy resin, obtained from epichlorohydrin and bisphenol A and having a molecular weight of about 30,000, each binder being used as a solution in a mixture of tetrahydrofuran and dioxane.

TABLE 1

|  | Examples | | | | | | Comparative |
|---|---|---|---|---|---|---|---|
|  | 1 | 2 | 3 | 4 | 5 | 6 | Experiment A |
| Chromium dioxide | 1,000 | 1,000 | 1,000 | 1,000 | 1,000 | 1,000 | 1,000 |
| 10% strength polyurethane solution | 1,550 | 1,550 | 1,550 | 1,550 | 1,550 | 1,550 | 1,550 |
| 20% strength vinyl chloride copolymer | 335 | 335 | 335 | 335 | 335 | 335 | 335 |
| Zinc stearate | 25 | 25 | 25 | 25 | 25 | 25 | — |
| Silicone oil | 5 | 5 | 5 | 5 | 5 | 5 | 5 |
| Butanone-oxime | 5 | — | — | 10 | — | — | — |
| Dimethylketoxime | — | 5 | — | — | — | — | — |
| Cyclohexanone-oxime | — | — | 5 | — | — | — | — |
| Acetaldoxime | — | — | — | — | 5 | — | — |
| Benzaldoxime | — | — | — | — | — | 5 | — |
| Tetrahydrofuran/dioxane | 737 | 737 | 737 | 737 | 737 | 737 | 737 |

TABLE 2

|  | Examples | | Comparative Experiments | |
|---|---|---|---|---|
|  | 7 | 8 | B | C |
| Chromium dioxide | 1,000 | — | 1,000 | — |
| Co-modified iron oxide | — | 1,000 | — | 1,000 |
| 10% strength polyurethane solution | 1,550 | 1,550 | 1,550 | 1,550 |
| 20% strength phenoxy resin solution | 335 | — | 335 | — |
| 20% strength polyvinylformal solution | — | 670 | — | 670 |
| Zinc stearate | 25 | — | 25 | — |
| Soybean lecithin | — | 25 | — | 25 |
| Silicone oil | 5 | 5 | 5 | 5 |
| Butanone-oxime | 5 | 10 | — | — |

The following were measured on the tapes produced in the Examples and the Comparative Experiments: the residual saturation magnetization ($M_R$) in mT and the orientation ratio (RF), ie. the ratio of residual induction in the playing direction to that in the crosswise direction, the surface roughness in terms of the average peak-to-valley height $Rt_m$, defined as the mean distance between the five highest peaks and the five lowest valleys, the maximum output level at short wavelengths, namely at 10 kc/s ($A_{10\ kc/s}$), and the maximum output level at long wavelengths, namely at 333 kc/s ($A_{333\ c/s}$), according to DIN 45,512, these last two properties being determined with reference to DIN reference tape C 401 R.

Table 3 shows the measurements obtained with the tapes from the various Examples and Comparative Experiments.

TABLE 3

|  | $M_R$ | RF | $Rt_m$ | $A_{333\ c/s}$ | $A_{10\ kc/s}$ |
|---|---|---|---|---|---|
| Example 1 | 148 | 2.6 | 0.12 | + 0.8 | + 1.2 |
| Example 2 | 150 | 2.8 | 0.10 | + 1.2 | + 1.7 |
| Example 3 | 151 | 2.7 | 0.10 | + 1.2 | + 1.3 |
| Example 4 | 157 | 2.9 | 0.08 | + 2.0 | + 2.2 |
| Example 5 | 144 | 2.6 | 0.12 | + 0.2 | + 1.6 |
| Example 6 | 147 | 2.6 | 0.13 | + 0.2 | + 1.0 |
| Comparative Experiment A | 141 | 2.4 | 0.16 | − 0.2 | + 0.1 |
| Example 7 | 149 | 2.6 | 0.11 | + 1.0 | + 1.5 |
| Comparative Experiment B | 140 | 2.2 | 0.15 | + 0.1 | − 0.2 |
| Example 8 | 156 | 2.7 | 0.09 | + 1.4 | + 2.2 |
| Comparative Experiment C | 144 | 2.5 | 0.14 | + 0.7 | + 0.8 |

We claim:

1. A process for the manufacture of a magnetic recording medium which comprises forming a dispersion of finely divided particulate anisotropic magnetic material in a solution of polymeric binder in an organic solvent, the dispersion containing from 0.05% to 5% by weight, based on the amount of the magnetic material, of a compound of the formula (I)

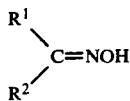

wherein $R^1$ is methyl, straight-chain or branched alkyl of 2 to 10 carbon atoms, cycloalkyl of 6 to 10 carbon atoms or aralkyl of 7 to 14 carbon atoms and $R^2$ is hydrogen, methyl, straight-chain or branched alkyl of 2 to 10 carbon atoms, cycloalkyl of 6 to 10 carbon atoms or aralkyl of 7 to 14 carbon atoms; applying a layer of the dispersion to a non-magnetizable base; and thereafter drying the layer of dispersion and magnetically orienting the particles of anisotropic magnetic material of said dispersion, said drying and orienting steps being effected in any order provided that the magnetic layer has not solidified prior to orientation of the particles.

2. A process for the manufacture of a magnetic recording medium as set forth in claim 1, wherein the compound of the formula (I) is selected from the group comprising aliphatic ketoximes.

3. A process for the manufacture of a magnetic recording medium as set forth in claim 2, wherein the aliphatic ketoxime is one having from 3 to 8 carbon atoms.

4. The process of claim 1 wherein the compound of the formula (I) is added after the magnetic material has been dispersed in the polymeric binder.

5. The process of claim 1 in which the dispersion contains from 0.2 to 2% of a compound of the formula (I).

6. The process of claim 1 in which the dispersion contains from 0.5 to 1% of a compound of the formula (I).

7. The process of claim 1 wherein the non-magnetizable base is from 4 to 200 μm in thickness.

8. The process of claim 7 wherein the layer of the dispersion applied to the non-magnetizable base is from 3 to 20 μm in thickness.

9. The process of claim 1 wherein the non-magnetizable base is from 6 to 36 μm in thickness.

10. The process of claim 9 wherein the layer of the dispersion applied to the non-magnetizable base is from 6 to 15 μm.

* * * * *